United States Patent [19]

Schucker

[11] 4,187,032
[45] Feb. 5, 1980

[54] HYDRAULIC PRESTRESSING DEVICE FOR SHEAR LEVER BOLTS

[75] Inventor: Thomas R. Schucker, York, Pa.

[73] Assignee: Allis-Chalmers Corporation, Milwaukee, Wis.

[21] Appl. No.: 952,997

[22] Filed: Oct. 20, 1978

[51] Int. Cl.² .......................... F16D 1/00; F16L 17/00; F16L 29/00
[52] U.S. Cl. ...................................... 403/15; 254/124; 415/159
[58] Field of Search ............... 403/15, 31, 28; 29/252, 29/446; 254/29 A, 124

[56] References Cited
U.S. PATENT DOCUMENTS

| 2,885,919 | 5/1959 | Carlson ............................ 29/252 X |
| 2,953,343 | 9/1960 | Heüsner ........................... 403/15 X |
| 3,121,941 | 2/1964 | Bellarts ............................ 29/252 |
| 3,494,592 | 2/1970 | Meschonat et al. .......... 254/29 A |
| 3,820,220 | 6/1974 | West .................................. 29/252 |

FOREIGN PATENT DOCUMENTS 1152345  5/1969  United Kingdom ............... 254/29 A Primary Examiner—Wayne L. Shedd
Attorney, Agent, or Firm—Robert C. Jones

[57] ABSTRACT

A hydraulic cylinder and piston mechanism which acts on opposing levers with a fulcrum bar interposed to prestress a shear lever bolt of a gate restraining mechanism of a hydraulic turbine without reacting on any other component.

2 Claims, 2 Drawing Figures

HYDRAULIC PRESTRESSING DEVICE FOR SHEAR LEVER BOLTS

BACKGROUND OF THE INVENTION

In a gate restraining mechanism in a hydraulic turbine, the bolt must be prestressed so as to provide the necessary force to effect adequate clamping of the shear lever on a hub. In the past it has been the practice to provide an axial opening through the bolt and insert an electrical heater therein to elongate the bolt. After the bolt had been elongated, the end nuts were snugged up and the bolt was allowed to cool. This method is time consuming; and, also, by drilling the axial opening in the bolt to accommodate the electrical heater, the bolt was weakened. The electrical heating method was also hazardous to the personnel working around the hot parts.

It is the general purpose of this invention to provide a prestressing device which operates solely on the piece to be prestressed of a mechanical arrangement without reacting on any other component of the arrangement.

Another object of the present invention is to provide a prestressing device which is removable after prestressing has been accomplished.

The present invention includes a relatively long bolt which is provided for prestressing in lieu of the normal length clamp bolt. The threaded ends of the bolt receive the normal clamping nut, and the extreme ends of the bolt receive end nuts. Two levers are attached to the ends of the end nuts by means of removable pins. A hydraulic cylinder and piston mechanism is connected to act upon the other ends of the levers. A fulcrum bar connected between the ends of the levers acts as a fulcrum for the levers. As the hydraulic cylinder and piston pulls on the levers, the force is transmitted to the bolt which is elongated. The clamping nuts are snugged up and the pressure in the cylinder released. Thereafter the pins are removed releasing the device from the bolt and the attaching ends nuts removed.

DESCRIPTION OF THE INVENTION

Figure 1:
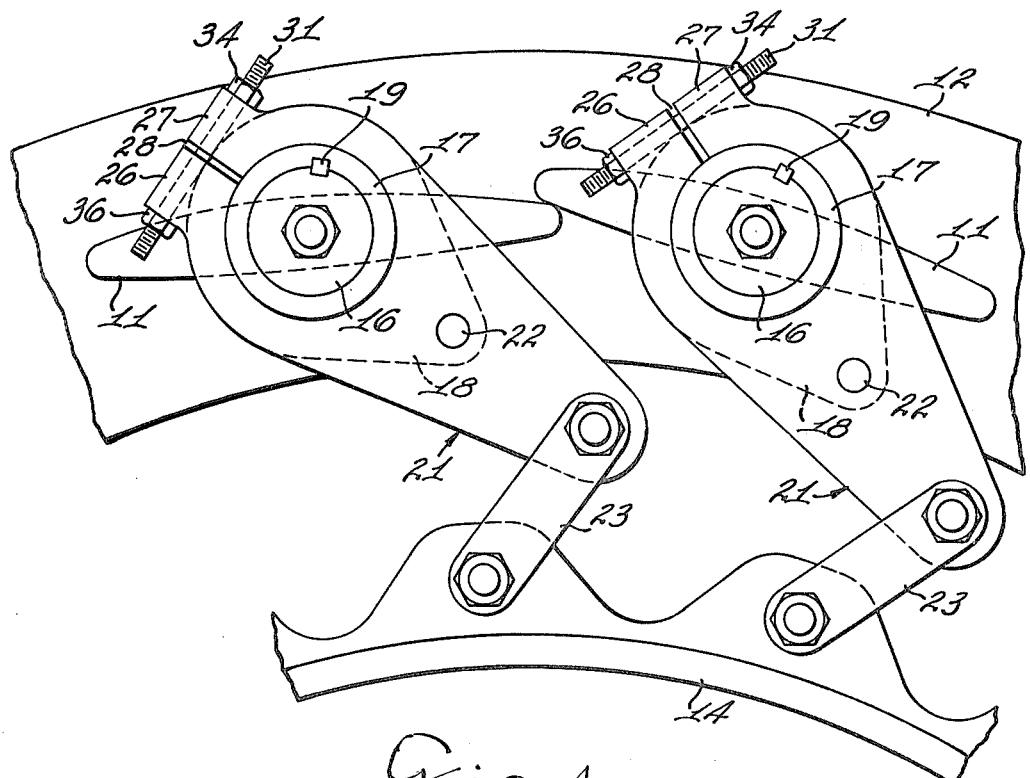
FIG. 1 is a fragmentary plan view of a portion of a wicket gate assembly with operators for the several wicket gates in which the present invention is incorporated; and, FIG. 2 is an enlarged view of the prestressing device of the present invention connected to an operator clamp bolt for prestressing the same.

Referring to FIG. 1 a hydraulic turbine includes a plurality of wicket gates 11 which are circumferentially spaced for pivotal movement between open and closed positions on an annular head cover 12. The wicket gates are operated simultaneously by a gate operating ring 14. To this purpose each of the wicket gates is operatively connected to the gate operating ring 14 by operating linkages. The operating linkages for each wicket is identical; thus, like parts will be identified by the same reference numerals.

As shown, the wicket gate 11 is provided with a shaft 16 on which is mounted a hub 17 of a strain link 18. A drive connection is established between the wicket gate shaft 16 and the hub 17 by means of a key 19. An operating lever arm 21 is mounted on the hub 17 of the strain link 18 and is connected to the strain link 18 by means of a strain pin 22. At one end the operating lever 21 is pivotally connected to one end of a drive link 23. The opposite end of the drive link 23 is pivotally connected to the gate operating ring 14.

With the single gate operating ring 14 connected to move all of the wicket gates 11 between open and closed positions simultaneously, the gates and their associated operating levers must be adjusted individually to establish a closed position for each gate with respect to adjacent gates. Also the position of the associated operating lever with respect to the wicket gate and its connection with gate operating ring 14 must be established. To this purpose the end of the operating lever 21 that is connected around the hub 17 by the strain lever 18 is split so as to present two resilient arms 26 and 27 that are spaced from each other by a gap or space 28. A threaded bolt 31 is inserted through bores 32 and 33 formed in bosses that are integral with the arms 26 and 27. Nuts 34 and 36 are engaged on the extending ends of the bolt 31 and snugged up to clamp the operating lever 21 to the hub 17.

However, the frictional engagement of the lever 21 on the hub 17 of the strain link 18 must be substantially equal to the shear force which will shear the pin 22. This ratio of forces is necessary so that damage to the wicket gate will not occur should the gate be blocked from moving by foreign substances lodging in the gate opening. In this case the pin 22 will shear and the operating lever 21 must slip around the hub 17. However, it is not possible to snug up the nuts 34 and 36 to provide the necessary frictional engagement of the bifurcated end of the operating lever 21 on the hub 17 with wrenches alone. Also, in a powerhouse there is not always sufficient space to apply power apparatus to the nuts 34 and 36 when it is necessary to readjust the gates. It is, therefore, necessary to prestress the bolt 31 so that the nuts 34 and 36 can be snugged up with hand tools to provide the desired clamping force.

Figure 2:
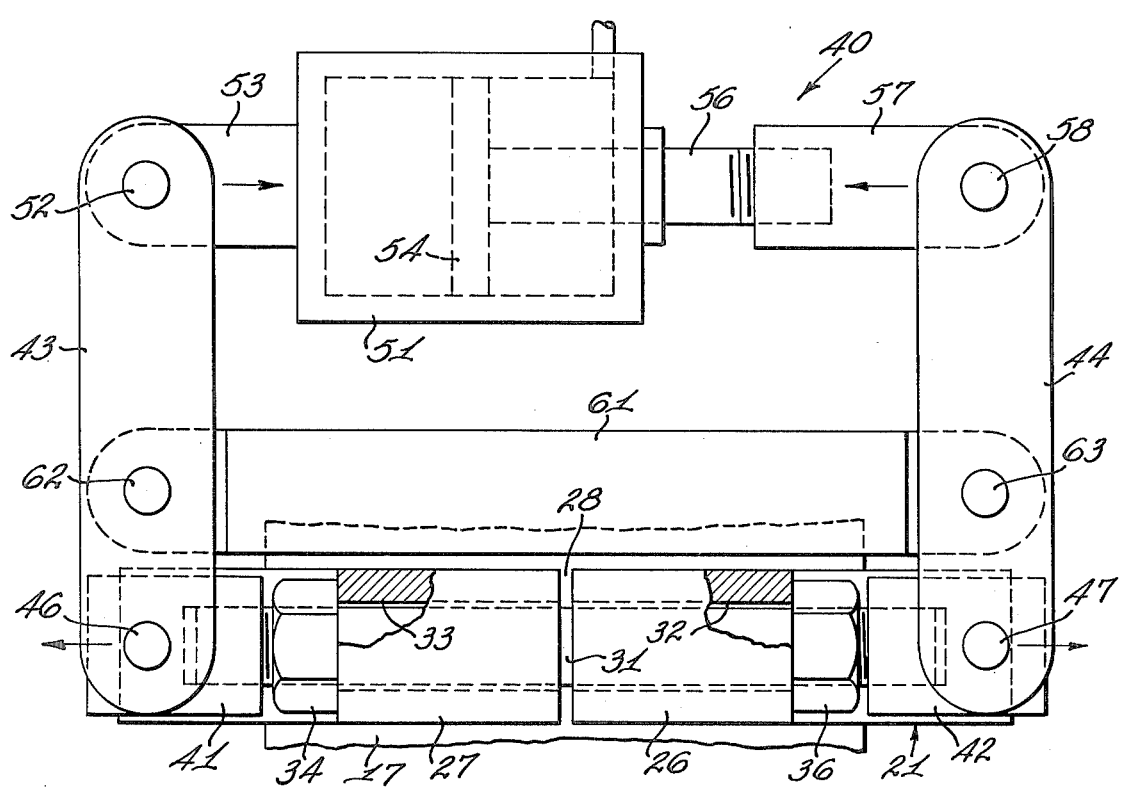

To this purpose, as shown in FIG. 2, there is provided a hydraulic actuated prestressing means 40 which is releasably attachable to the bolt 31 for prestressing the same. The prestressing means 40 acts solely on the bolt 31 and not on any other component of the wicket gates or the associated operators. The prestressing means 40 includes a pair of stressing nuts 41 and 42. The nuts 41 and 42 are cylindrical in form and are threaded on each end of the bolt 31 outwardly of the clamp nuts 34 and 36. A pair of levers 43 and 44 are removably and pivotally attached to the stressing nuts 41 and 42 by means of pins 46 and 47. A hydraulic cylinder 51 is connected to the opposite end of the lever 43 by a pin 52 that extends through a suitable bracket 53 welded or otherwise secured to the end of the cylinder. Within the cylinder 51 is a reciprocal piston 54 having a piston rod 56 which extends outwardly of the cylinder 51. The free end of the piston rod 56 is provided with a threaded fitting 57 and is connected to the end of the lever 44 by a removable pin 58. A fulcrum bar 61 is connected by pins 62 and 63 to the levers 43 and 44 and is located so as to provide substantially 2-to-1 mechanical advantage.

In operation hydraulic pressure is admitted to the cylinder 51 at the rod side of piston 54. The fluid pressure acting on the piston 54 on the rod side thereof will cause the connected ends of the levers 43 and 44 to be pulled inwardly toward each other. The fulcrum bar 61 provides a fulcrum for the levers and the levers transfer the force to the ends of the bolt 31 to elongate the bolt. With the bolt 31 in a prestressed condition, the clamp nuts 34 and 36 are snugged up and the pressure in the cylinder released.

It is apparent that the present invention by utilizing opposing levers and a fulcrum does not react on any other component of the gate apparatus other than the clamp bolt with which it is directly concerned. The present invention does not weaken the bolt and does not present hazards to personnel. The device can be utilized where the clearance beyond the ends of the bolt is limited.

The embodiments of the invention in which an exclusive property or privilege is claimed are defined as follows:

1. A prestressing device for a threaded clamping bolt utilized to frictionally clamp a first operating member to a second operating member;
    a clamp bolt extending through the first operating member;
    lever means pivotally connected to the extending ends of said clamp bolt;
    a fulcrum bar interconnected between said lever means;
    a pressure fluid operator means interconnected between said lever means and operable when energized to move said lever means on said fulcrum bar to effect prestressing of said clamp bolt; and,
    means on said clamp bolt engageable with the first operating means to effectively clamp said first operating member to the second operating means after said pressure fluid operator is deenergized.

2. A removable prestressing device for a threaded clamping bolt for frictionally securing an operating member in a desired position;
    an elongated bolt extending through the operating member;
    thread means on the extending ends of said elongated bolt;
    a clamp nut engaged on each extending end of said bolt in position adjacent the operating member;
    a stress nut threadedly engaged on each extending end of said bolt outwardly of the clamp bolts;
    a first lever having one end pivotally connected to one of said stress nuts;
    a second lever having one end pivotally connected to the other of said stress nuts;
    a hydraulic piston and cylinder mechanism interposed between the free ends of said levers and pivotally connected to the free ends thereof; and,
    a fulcrum bar pivotally connected between said levers at a point between the ends thereof;
    whereby pressure fluid to said piston and cylinder mechanisms will operae said piston and cylinder mechanism to effect movement of the force ends of said levers inwardly toward each other and said levers acting over the fulcrum bar will prestress said bolt and said clamp nuts may be snugged up against the operating member.

* * * * *